(12) United States Patent
Suzuki et al.

(10) Patent No.: US 9,340,659 B2
(45) Date of Patent: *May 17, 2016

(54) ALIPHATIC POLYESTER RESIN COMPOSITION AND MOLDED ARTICLE CONTAINING THIS RESIN COMPOSITION

(71) Applicant: KANEKA CORPORATION, Osaka-shi (JP)

(72) Inventors: Noriyuki Suzuki, Settsu (JP); Tetsuya Minami, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/439,512

(22) PCT Filed: Oct. 28, 2013

(86) PCT No.: PCT/JP2013/006365
§ 371 (c)(1),
(2) Date: Apr. 29, 2015

(87) PCT Pub. No.: WO2014/068943
PCT Pub. Date: May 8, 2014

(65) Prior Publication Data
US 2015/0291771 A1  Oct. 15, 2015

(30) Foreign Application Priority Data
Oct. 29, 2012  (JP) .................... 2012-237437

(51) Int. Cl.
*C08K 5/20* (2006.01)
*C08K 5/053* (2006.01)
*C08L 101/16* (2006.01)

(52) U.S. Cl.
CPC . *C08K 5/20* (2013.01); *C08K 5/053* (2013.01); *C08L 101/16* (2013.01)

(58) Field of Classification Search
CPC ......... C08K 5/20; C08K 5/053; C08L 101/16
See application file for complete search history.

(56) References Cited

U.S. PATENT DOCUMENTS

| 6,127,512 A * | 10/2000 | Asrar et al. ............... 528/272 |
| 2008/0033077 A1 * | 2/2008 | Hashimoto et al. ............ 524/9 |
| 2015/0166785 A1 | 6/2015 | Minami et al. |

FOREIGN PATENT DOCUMENTS

| JP | 2008 513578 | 5/2008 |
| WO | 2006 031940 | 3/2006 |

OTHER PUBLICATIONS

International Search Report Issued Nov. 19, 2013 in PCT/JP13/006365 Filed Oct. 28, 2013.
U.S. Appl. No. 14/435,297, filed Apr. 13, 2015, Suzuki, et al.
U.S. Appl. No. 14/419,414, filed Feb. 3, 2015, Abe, et al.
U.S. Appl. No. 14/767,144, filed Aug. 11, 2015, Minami, et al.

* cited by examiner

*Primary Examiner* — John Uselding
(74) *Attorney, Agent, or Firm* — Oblon, McClelland, Maier & Neustadt, L.L.P.

(57) ABSTRACT

The present invention provides a resin composition that improves slow crystallization, which is a drawback of polyhydroxyalkanoates, and is excellent in molding processability and productivity. The resin composition is an aliphatic polyester resin composition comprising a polyhydroxyalkanoate (A), an amide bond-containing compound (B), and pentaerythritol (C), wherein the amide bond-containing compound (B) is represented by any one of the following general formulas: $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, and $R^1$—NHC(O)NH—($R^3$)—NHC(O)—$R^1$.

6 Claims, No Drawings

ALIPHATIC POLYESTER RESIN COMPOSITION AND MOLDED ARTICLE CONTAINING THIS RESIN COMPOSITION

TECHNICAL FIELD

The present invention relates to an aliphatic polyester resin composition, and particularly relates to a polyester resin composition intended to allow a biodegradable polyester resin, which is decomposed by the action of microorganisms, to be applied to various industrial materials, and a molded article comprising such a polyester resin composition.

BACKGROUND ART

In recent years, biodegradable plastics have been actively developed as materials that can solve problems caused by the heavy burden of plastic waste on the global environment, such as harmful effects on the ecosystem, generation of harmful gas during combustion, and global warming due to a large amount of heat generated by combustion.

Particularly, carbon dioxide generated by combustion of plant-derived biodegradable plastics was originally present in the air. Therefore, combustion of plant-derived biodegradable plastics does not increase the amount of carbon dioxide in the atmosphere. This is referred to as "carbon neutral", and is regarded as important under The Kyoto Protocol that sets targets for reducing carbon dioxide emissions. Therefore, active use of plant-derived biodegradable plastics is desired.

Recently, from the viewpoint of biodegradability and carbon neutral, aliphatic polyester-based resins have received attention as plant-derived plastics. Particularly, polyhydroxyalkanoate (hereinafter, sometimes referred to as PHA)-based resins have received attention. Among PHA-based resins, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins, polylactic acid, etc. have received attention.

However, it is known that the PHA-based resins are slow in crystallization. Therefore, the PHA-based resins require a long cooling time for solidification after heat-melting in molding processing, which causes problems such as poor molding processability and poor productivity.

Therefore, blending of a PHA-based resin with an inorganic material such as boron nitride, titanium oxide, talc, lamellar silicate, calcium carbonate, sodium chloride, or metal phosphate has heretofore been proposed to promote crystallization. However, the blending with an inorganic material has many adverse effects on a resulting molded article, such as reduction in tensile elongation and poor appearance, and is therefore poorly effective.

PTL 1 discloses that blending of a PHA-based resin with an amide bond-containing compound promotes the crystallization of the PHA-based resin. However, further improvement is desired to improve productivity.

CITATION LIST

Patent Documents

Patent Document 1: JP-T-2008-513578

SUMMARY OF INVENTION

Technical Problem

It is an object of the present invention to improve slow crystallization that is a drawback of biodegradable polyesters, especially polyhydroxyalkanoates, which are decomposed into water and carbon dioxide by the action of microorganisms, to provide a resin composition that has improved molding processability in molding processing such as injection molding or sheet molding and exhibits excellent productivity in molding or pellet production.

Solution to Problem

The present inventors have found that the crystallization of a polyhydroxyalkanoate slow in crystallization can be promoted by blending the polyhydroxyalkanoate with an amide bond-containing compound and pentaerythritol so that molding processability and productivity are improved, which has led to the completion of the present invention.

That is, the present invention is directed to an aliphatic polyester resin composition comprising a polyhydroxyalkanoate (A), an amide bond-containing compound (B), and pentaerythritol (C), wherein the amide bond-containing compound (B) is any one of compounds represented by the following general formulas: $R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, and $R^1$—NHC(O)NH—($R^3$)—NHC(O)—$R^1$, or a combination of two or more of the compounds, and in the formulas, $R^1$s are each independently a $C_6$ to $C_{30}$ alkyl,
$R^2$s are each independently H or a $C_1$ to $C_{20}$ alkyl, and
$R^3$s are each independently a $C_2$ to $C_{10}$ alkylene.

The amide bond-containing compound (B) is preferably one or more selected from lauramide, myristamide, stearamide, behenamide, and erucamide.

The amount of the pentaerythritol (C) is preferably 0.05 to 12 parts by weight with respect to 100 parts by weight of the polyhydroxyalkanoate (A).

The polyhydroxyalkanoate (A) preferably contains a repeating unit represented by the following general formula (1)

[—CHR—CH$_2$—CO—O—]            (1)

(wherein R is an alkyl group represented by $C_nH_{2n+1}$ and n is an integer of 1 or more and 15 or less).

The polyhydroxyalkanoate (A) is preferably one or more selected from a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, and a poly(3-hydroxybutyrate-co-4-hydroxybutyrate) copolymer resin.

The present invention is also directed to a polyester resin molded article obtained by molding the aliphatic polyester resin composition.

Advantageous Effects of Invention

The resin composition according to the present invention can improve slow crystallization of a polyhydroxyalkanoate to improve molding processability in molding processing, such as injection molding or sheet molding, and productivity in molding or pellet production.

DESCRIPTION OF EMBODIMENTS

Hereinbelow, the present invention will be described in more detail.

An aliphatic polyester resin composition according to the present invention contains a PHA (A), an amide bond-containing compound (B), and pentaerythritol (C).

[Polyhydroxyalkanoate (A)]

In the present invention, the PHA (A) is an aliphatic polyester resin containing a repeating unit represented by the following general formula: [—CHR—$CH_2$—CO—O—].

The PHA (A) used in the present invention is preferably an aliphatic polyester containing a repeating unit represented by the following formula (1): [—CHR—$CH_2$—CO—O—] (wherein R is an alkyl group represented by $C_nH_{2n+1}$ and n is an integer of 1 or more and 15 or less).

Particularly, from the viewpoint of molding processability and the physical properties of a molded article, the PHA (A) preferably contains a 3-hydroxybutyrate unit, a 3-hydroxyvalerate unit, a 3-hydroxyhexanoate unit, or a 4-hydroxybutyrate unit.

Further, the PHA (A) is preferably a polymer resin comprising 80 mol % or more of 3-hydroxybutyrate, and is more preferably a polymer resin comprising 85 mol % or more of 3-hydroxybutyrate. The PHA (A) is preferably produced by a microorganism. Specific examples of the PHA (A) include a poly(3-hydroxybutyrate) homopolymer resin, a poly(3-hydroxybutyrate-co-3-hydroxypropionate) copolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, a poly(3-hydroxybutyrate-co-3-hydroxyheptanoate) copolymer resin, a poly(3-hydroxybutyrate-co-3-hydroxyoctanoate) copolymer resin, a poly(3-hydroxybutyrate-co-3-hydroxynonanoate) copolymer resin, a poly(3-hydroxybutyrate-co-3-hydroxydecanoate) copolymer resin, a poly(3-hydroxybutyrate-co-3-hydroxyundecanoate) copolymer resin, and a poly(3-hydroxybutyrate-co-4-hydroxybutyrate) copolymer resin.

Particularly, from the viewpoint of molding processability and the physical properties of a molded article, a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, and a poly(3-hydroxybutyrate-co-4-hydroxybutyrate) copolymer resin are suitable for use as the PHA (A).

From the viewpoint of molding processability and the quality of a molded article, the content of 3-hydroxybutyrate (hereinafter, sometimes referred to as 3HB) to a comonomer copolymerized therewith, such as 3-hydroxyvalerate (hereinafter, sometimes referred to as 3HV), 3-hydroxyhexanoate (hereinafter, sometimes referred to as 3HH), or 4-hydroxybutyrate (hereinafter, sometimes referred to as 4HB), in the PHA (A), that is, the content of monomers in a copolymer resin as the PHA (A) is preferably 97/3 to 80/20 (mol %/mol %), more preferably 95/5 to 85/15 (mol %/mol %). If the comonomer content is less than 3 mol %, there is a case where a molding processing temperature and a pyrolysis temperature are close to each other, and therefore molding processing is difficult to perform. If the comonomer content exceeds 20 mol %, there is a case where the PHA(A) is slowly crystallized, and therefore productivity is poor.

Each monomer content in a copolymer resin as the PHA (A) can be measured by gas chromatography in the following manner. About 20 mg of the dry PHA is mixed with 2 mL of a sulfuric acid/methanol mixed liquid (15/85 (weight ratio)) and 2 mL of chloroform in a vessel, and the vessel is tightly sealed. Then, the mixture is heated at 100° C. for 140 minutes to obtain a methyl ester of PHA degradation product. After cooling, 1.5 g of sodium hydrogen carbonate is added thereto little by little for neutralization, and the resulting mixture is allowed to stand until generation of carbon dioxide gas is stopped. The mixture is well mixed with 4 mL of diisopropyl ether, and then the monomer unit composition of the PHA degradation product in a supernatant is analyzed by capillary gas chromatography to determine each monomer content in the copolymer resin.

The gas chromatography is performed using "GC-17A" manufactured by SHIMADZU CORPORATION as a gas chromatograph and "NEUTRA BOND-1" (column length: 25 m, column inner diameter: 0.25 mm, liquid film thickness: 0.4 μm) manufactured by GL Sciences Inc. as a capillary column. He gas is used as a carrier gas, a column inlet pressure is set to 100 kPa, and a sample is injected in an amount of 1 μL. As for temperature conditions, the temperature is increased from an initial temperature of 100° C. to 200° C. at a rate of 8° C./min, and is further increased from 200 to 290° C. at a rate of 30° C./min.

In the present invention, the weight-average molecular weight (hereinafter, sometimes referred to as Mw) of the PHA (A) is preferably 200000 to 2500000, more preferably 250000 to 2000000, even more preferably 300000 to 1000000. If the weight-average molecular weight is less than 200000, there is a case where, for example, mechanical properties are poor. If the weight-average molecular weight exceeds 2500000, there is a case where molding processing is difficult to perform.

The weight-average molecular weight can be measured using a gel permeation chromatograph (GPC) ("Shodex GPC-101" manufactured by Showa Denko K.K.), a polystyrene gel column ("Shodex K-804" manufactured by Showa Denko K.K.), and chloroform as a mobile phase, and can be determined as a molecular weight based on a polystyrene calibration curve. In this case, the calibration curve is prepared using polystyrene standards having weight-average molecular weights of 31400, 197000, 668000, and 1920000.

It is to be noted that the PHA is produced by a microorganism such as *Alcaligenes eutrophus* AC32 strain produced by introducing a PHA synthetic enzyme gene derived from *Aeromonas caviae* into *Alcaligenes eutrophus* (International Deposit under Budapest Treaty, International Depository Authority: International Patent Organism Depositary, National Institute of Advanced Science and Technology (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (J. Bacteriol., 179, 4821 (1997)).

[Amide Bond-Containing Compound (B)]

The amide bond-containing compound (B) used in the present invention is any one of compounds represented by the following general formulas:
$R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)

NH—R$^1$, and R$^1$—NHC(O)NH—(R$^3$)—NHC(O)—R$^1$. These compounds may be used singly or in combination of two or more of them.

R$^1$s are each independently a C$_6$ to C$_{30}$ alkyl, preferably a C$_{12}$ to C$_{22}$ alkyl. R$^2$s are each independently H or a C$_1$ to C$_{20}$ alkyl, preferably H or a C$_1$ to C$_6$ alkyl, more preferably H. R$^3$s are each independently a C$_2$ to C$_{10}$ alkylene, preferably a C$_2$ to C$_6$ alkylene. Here, the alkyl group or alkylene group may be saturated or unsaturated.

Among them, from the viewpoint of affinity for the polyhydroxyalkanoate (A), a compound represented by R$^1$—C(O)NH$_2$ is preferred. Specific examples of such a compound include lauramide, myristamide, stearamide, behenamide, and erucamide.

The amount of the amide bond-containing compound (B) used in the present invention is not particularly limited as long as the crystallization of the polyhydroxyalkanoate (A) can be promoted. However, in order to obtain the effect of the amide bond-containing compound (B) as a crystal nucleating agent, the lower limit of the amount of the amide bond-containing compound (B) contained is preferably 0.01 parts by weight, more preferably 0.05 parts by weight, even more preferably 0.1 parts by weight with respect to 100 parts by weight of the amount of the polyhydroxyalkanoate (A) contained. If the amount of the amide bond-containing compound (B) is too large, there is a case where the viscosity of the aliphatic polyester resin composition during melt processing is reduced, and therefore it is difficult to process the aliphatic polyester resin composition. Therefore, the upper limit of the amount of the amide bond-containing compound (B) contained is preferably 10 parts by weight, more preferably 7 parts by weight, even more preferably 5 parts by weight with respect to 100 parts by weight of the amount of the polyhydroxyalkanoate (A) contained.

[Pentaerythritol (C)]

The aliphatic polyester resin composition according to the present invention uses pentaerythritol (C) as a crystal nucleating agent for the polyhydroxyalkanoate (A).

The pentaerythritol (C) is a compound represented by the following formula (2).

[Chemical Formula 1]

(2)

The pentaerythritol (C) is one of polyhydric alcohols and is an organic compound in a white crystal form with a melting point of 260.5° C. The pentaerythritol (C) is classified as a sugar alcohol, but is not derived from a natural product and can be synthesized by condensation of acetaldehyde and formaldehyde in a basic environment.

The pentaerythritol (C) used in the present invention is not particularly limited as long as it is usually commonly available, and may be a reagent or an industrial product. Examples of the reagent include, but are not limited to, those manufactured by Wako Pure Chemical Industries, Ltd., Sigma-Aldrich, Tokyo Chemical Industry Co., Ltd., and Merck Ltd. Examples of the industrial product include, but are not limited to, those manufactured by KOEI CHEMICAL CO., LTD. (trade name: Pentarit) and TOYO CHEMICALS CO., LTD.

Some of such commonly-available reagents and industrial products contain, as an impurity, an oligomer produced by dehydration condensation of the pentaerythritol (C), such as dipentaerythritol or tripentaerythritol. The oligomer does not have the effect of crystallizing the polyhydroxyalkanoate (A), but does not inhibit the crystallization effect of the pentaerythritol (C). Therefore, the oligomer may be contained.

The amount of the pentaerythritol (C) used in the present invention is not particularly limited as long as the crystallization of the polyhydroxyalkanoate (A) can be promoted. However, in order to obtain the effect of the pentaerythritol (C) as a crystal nucleating agent, the lower limit of the amount of the pentaerythritol (C) contained is preferably 0.05 parts by weight, more preferably 0.1 parts by weight, even more preferably 0.5 parts by weight with respect to 100 parts by weight of the amount of the polyhydroxyalkanoate (A) contained. If the amount of the pentaerythritol (C) is too large, there is a case where the viscosity of the aliphatic polyester resin composition during melt processing is reduced, and therefore it is difficult to process the aliphatic polyester resin composition. Therefore, the upper limit of the amount of the pentaerythritol (C) contained is preferably 12 parts by weight, more preferably 10 parts by weight, even more preferably 8 parts by weight with respect to 100 parts by weight of the amount of the polyhydroxyalkanoate (A) contained.

[Aliphatic Polyester Resin Composition]

The aliphatic polyester resin composition according to the present invention is superior to a polyhydroxyalkanoate itself, a resin composition comprising a polyhydroxyalkanoate and an amide bond-containing compound, or a resin composition comprising a polyhydroxyalkanoate and a sugar alcohol compound other than pentaerythritol in that crystallization of the resin composition stably progresses during processing under a wide range of processing conditions, and therefore has the following advantages.

In the case of poly(3-hydroxybutyrate-co-3-hydroxyhexanoate) (P3HB3HH) or poly(3-hydroxybutyrate-co-3-hydroxyvalerate) (P3HB3HV) as an example of the polyhydroxyalkanoate, the progress of its crystallization induced by cooling after heat-melting is influenced by a resin temperature during melting. That is, the crystallization is less likely to progress when a resin temperature during melting is higher. For example, in the case of P3HB3HH, when a resin temperature during melting is in the range of the melting point of the resin to about 170° C., the crystallization of the resin during cooling is less likely to progress when the resin temperature during melting is higher. Further, when the resin temperature during melting is about 180° C. or higher, the crystallization of the resin during cooling tends to progress over several hours. Therefore, in order to successfully perform molding processing, the resin temperature during melting needs to be controlled to be in the range of about 170° C. to 180° C. However, in commonly-performed molding processing, the resin temperature during melting is not uniform, and therefore it is very difficult to control the resin temperature during melting to be in the above range.

The crystallization of the aliphatic polyester resin composition according to the present invention stably progresses even when a resin temperature during melting is in a wide range. That is, the crystallization of the resin composition quickly progresses with stability even when a resin temperature during melting is in the range of the melting point of the resin to about 190° C., and therefore the resin composition according to the present invention has excellent processing characteristics under a wide range of processing conditions. It is to be noted that from the viewpoint of thermal degradation, it is not preferred that melt processing is performed when the resin temperature during melting is 200° C. or higher.

Further, the progress of crystallization of the polyhydroxyalkanoate (A) depends also on a cooling temperature. For example, in the case of P3HB3HH, its crystallization tends to most progress when a cooling temperature after heat-melting is 50 to 70° C., and its crystallization is less likely to progress when the cooling temperature is lower than 50° C. or higher than 70° C. In commonly-performed molding processing, a mold temperature correlates to the cooling temperature, and therefore needs to be controlled to be in the above temperature range of 50° C. to 70° C. However, in order to uniformly control the mold temperature, the structure or shape of a mold needs to be tightly designed, which is very difficult.

The crystallization of the aliphatic polyester resin composition according to the present invention stably progresses even when the cooling temperature of the resin after melting is in a wide range. That is, the crystallization of the resin composition quickly progresses with stability even when a cooling temperature after heat-melting is in the range of 20° C. to 80° C., and therefore the resin composition according to the present invention has excellent processing characteristics under a wide range of processing conditions.

The aliphatic polyester resin composition according to the present invention has the above advantages that cannot be obtained by any conventional polyhydroxyalkanoate itself, resin composition comprising a polyhydroxyalkanoate and an amide bond-containing compound, or resin composition comprising a polyhydroxyalkanoate and a sugar alcohol compound other than the pentaerythritol, which makes it possible to set a resin temperature during melting or a cooling temperature, such as a mold temperature, over a wide range. Therefore, the aliphatic polyester resin composition has excellent processing characteristics.

The aliphatic polyester resin composition according to the present invention is quickly crystallized with stability, and therefore exhibits the following characteristics.

For example, in the case of P3HB3HH, its crystallization does not sufficiently progress during molding, and therefore gradually progresses even after molding so that spherulites grow. This tends to gradually embrittle a molded article due to a temporal change in mechanical properties. On the other hand, in the case of the aliphatic polyester resin composition according to the present invention, a plurality of microcrystals are formed just after molding, and therefore spherulites are less likely to grow after molding. This suppresses embrittlement of a molded article. Therefore, the aliphatic polyester resin composition is excellent in the quality stability of its product.

Further, there is a gap at a joint between cavities of a mold for injection molding (e.g., parting line portion, insertion portion, slide core sliding portion), and therefore "burr" formed by injecting a molten resin into the gap during injection molding is attached to a molded article. The polyhydroxyalkanoate is slowly crystallized and has flowability for a long period of time. Therefore, burr is easily formed, and post-processing of a molded article requires much effort. However, the aliphatic polyester resin composition according to the present invention is quickly crystallized, which makes it difficult to form burr. Therefore, effort required for post-processing of a molded article can be reduced, which is preferred from a practical point of view.

The aliphatic polyester resin composition according to the present invention can be easily produced by a known melt-kneading machine as long as the machine can heat the polyester resin composition to a temperature equal to or higher than the melting point of the polyhydroxyalkanoate (A) and can knead the polyester resin composition. For example, the polyhydroxyalkanoate (A), the amide bond-containing compound (B), the pentaerythritol (C), and if necessary, another component may be melt-kneaded by an extruder, a roll mill, a Banbury mixer, or the like to form pellets, and then the pellets may be subjected to molding. Alternatively, a previously-prepared masterbatch containing high concentrations of the amide bond-containing compound (B) and the pentaerythritol (C) may be blended with the polyhydroxyalkanoate (A) in a desired ratio, and the resulting mixture may be melt-kneaded and subjected to molding. The pentaerythritol (C), the polyhydroxyalkanoate (A), and the amide bond-containing compound (B) may be added to a kneading machine at the same time. Alternatively, the amide bond-containing compound (B) and the pentaerythritol (C) may be added after the polyhydroxyalkanoate (A) is melted.

The aliphatic polyester resin composition according to the present invention may comprise various additives as long as the effects of the present invention are not impaired. Examples of the additives include lubricants, crystal nucleating agents other than the pentaerythritol (C) and the amide bond-containing compound (B), plasticizers, hydrolysis inhibitors, antioxidants, releasing agents, ultraviolet absorbers, coloring agents such as dyes and pigments, and inorganic fillers. These additives may be used depending on the intended use, but preferably have biodegradability.

Other examples of the additives include inorganic fibers such as carbon fibers and organic fibers such as human hair and wool. Alternatively, natural fibers may be used, such as bamboo fibers, pulp fibers, kenaf fibers, analogous other plant alternatives, annual herbaceous plants of the genus *Hibiscus*, family Malvaceae, and annual herbaceous plants of the family Tiliaceae. From the viewpoint of carbon dioxide reduction, plant-derived natural fibers are preferred, and kenaf fibers are particularly preferred.

[Molded Article Comprising Aliphatic Polyester Resin Composition]

The following is an example of a method for producing a molded article comprising the aliphatic polyester resin composition according to the present invention.

First, the PHA (A), the amide bond-containing compound (B), the pentaerythritol (C), and if necessary, the above-described various additives are melt-kneaded using an extruder, a kneader, a Banbury mixer, rolls, or the like to prepare an aliphatic polyester resin composition. Then, the aliphatic polyester resin composition is extruded into a strand, and the strand is cut to obtain aliphatic polyester resin composition pellets having a particle shape such as a column shape, an elliptic column shape, a spherical shape, a cubic shape, or a rectangular parallelepiped shape.

In the above-described melt-kneading, the temperature at which the PHA(A) is melt-kneaded depends on the melting point, melt viscosity, etc. of the PHA (A) used, so that the temperature cannot generally be defined. However, the resin temperature of a melt-kneaded product at a die outlet is preferably 140 to 200° C., more preferably 150 to 195° C., even more preferably 160 to 190° C. If the resin temperature of a melt-kneaded product is less than 140° C., there is a case where kneading is insufficient. If the resin temperature of a melt-kneaded product exceeds 200° C., there is a case where the PHA (A) is thermally decomposed.

The pellets prepared by the above method are sufficiently dried at 40 to 80° C. to remove moisture. Then, the pellets can be mold-processed by a known mold processing method to obtain any molded article. Examples of the molding processing method include film molding, sheet molding, injection molding, blow molding, blow molding, fiber spinning, extrusion foaming, and bead foaming.

Examples of a method for producing a sheet molded article include T-die extrusion molding, calender molding, and roll molding. However, the sheet molding methods are not limited thereto. The temperature at which sheet molding is performed is preferably 140 to 190° C. Further, a sheet obtained from the aliphatic polyester resin composition according to the present invention can be subjected to heat molding, vacuum molding, press molding, or sheet blow molding.

Examples of a method for producing an injection-molded article include injection molding methods such as an injection molding method commonly used to mold a thermoplastic resin, a gas assist molding method, and an injection compression molding method. According to the intended use, any injection molding method other than the above methods may be also used, such as an in-mold molding method, a gas press molding method, a two-color molding method, a sandwich molding method, PUSH-PULL, or SCORIM. However, the injection molding methods are not limited thereto. The temperature at which injection molding is performed is preferably 140 to 190° C., and the temperature of a mold is preferably 20 to 80° C., more preferably 30 to 70° C.

The molded article according to the present invention is suitable for use in the fields of agriculture, fishery, forestry, gardening, medicine, sanitary items, food industry, clothing, non-clothing, packaging, automobiles, building materials, etc.

EXAMPLES

Hereinbelow, the present invention will be specifically described with reference to examples, but the technical scope of the present invention is not limited by these examples.

Polyhydroxyalkanoate as a raw material A1: Polyhydroxyalkanoate obtained in Production Example 1 was used.

Production Example 1

The culture production of PHA was performed using KNK-005 strain (see U.S. Pat. No. 7,384,766).

The composition of a seed medium was: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH 6.8).

The composition of a preculture medium was: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). Palm oil was added at a time as a carbon source at a concentration of 10 g/L.

The composition of a PHA production medium was: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX 200K (defoaming agent: manufactured by Cognis Japan Ltd.).

First, a glycerol stock (50 µL) of KNK-005 strain was inoculated into the seed medium (10 mL) and seed-cultured for 24 hours. Then, the resulting seed culture was inoculated at 1.0 v/v % into a 3-liter jar fermenter (MDL-300 manufactured by B. E. MARUBISHI Co., Ltd.) containing 1.8 L of the preculture medium. Preculture was performed for 28 hours under operation conditions where a culture temperature was 33° C., a stirring speed was 500 rpm, and a ventilation volume was 1.8 L/min while pH was controlled to be in the range of 6.7 to 6.8. The pH control was performed using a 14% aqueous ammonium hydroxide solution.

Then, the resulting preculture was inoculated at 1.0 v/v % into a 10-liter jar fermenter (MDS-1000 manufactured by B. E. MARUBISHI Co., Ltd.) containing 6 L of the production medium. Culture was performed under operation conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. Palm oil was used as a carbon source. The culture was performed for 64 hours. After the completion of the culture, cells were collected by centrifugal separation, washed with methanol, and lyophilized to measure the weight of the dried cells.

One-hundred milliliters of chloroform was added to 1 g of the obtained dried cells, and the resulting mixture was stirred at room temperature all day and night to extract PHA from the cells. The mixture was filtered to remove cell debris, and the resulting filtrate was concentrated by an evaporator until its total volume became 30 mL. Then, 90 mL of hexane was gradually added to the filtrate, and the resulting mixture was allowed to stand for 1 hour while being gently stirred. The mixture was filtered to separate the deposited PHA, and the PHA was vacuum-dried at 50° C. for 3 hours. The 3HH content of the obtained PHA was measured by gas chromatography in the following manner. Twenty milligrams of the dried PHA was mixed with 2 mL of a sulfuric acid-methanol mixed liquid (15:85) and 2 mL of chloroform in a vessel, and the vessel was tightly sealed. Then, the resulting mixture was heated at 100° C. for 140 minutes to obtain a methyl ester of PHA degradation product. After cooling, 1.5 g of sodium hydrogen carbonate was added thereto little by little for neutralization, and the resulting mixture was allowed to stand until generation of carbon dioxide gas was stopped. The mixture was well mixed with 4 mL of diisopropyl ether and then centrifuged. Then, the monomer unit composition of the polyester degradation product in a supernatant was analyzed by capillary gas chromatography. The gas chromatography was performed using GC-17A manufactured by SHIMADZU CORPORATION as a gas chromatograph and NEUTRA BOND-1 (column length: 25 m, column inner diameter: 0.25 mm, liquid film thickness: 0.4 µm) manufactured by GL Sciences Inc. as a capillary column. He gas was used as a carrier gas, a column inlet pressure was set to 100 kPa, and a sample was injected in an amount of 1 µL. As for temperature conditions, the temperature was increased from an initial temperature of 100 to 200° C. at a rate of 8° C./min, and was further increased from 200 to 290° C. at a rate of 30° C./min. As a result of the analysis performed under the above conditions, the PHA was found to be poly(3-hydroxybutyrate-co-3-hydroxyhexanoate (PHBH) represented by the chemical formula (1). The 3-hydroxyhexanoate (3HH) content was 5.6 mol % (3HB content: 94.4 mol %).

After the completion of the culture, PHBH was obtained from the culture by the method described in WO 2010/067543. The PHBH had a weight-average molecular weight Mw of 600000 as measured by GPC.

Polyhydroxyalkanoate as raw material A2: Polyhydroxyalkanoate obtained in Production Example 2 was used.

Production Example 2

A polyhydroxyalkanoate as a raw material A2, PHBH, was obtained in the same manner as in Production Example 1 except that KNK-631 strain (see WO 2009/145164) was used instead of KNK-005 strain. The PHBH had a weight-average molecular weight Mw of 620000 and a 3HH content of 7.8 mol % (3HB content: 92.2 mol %).

Polyhydroxyalkanoate as raw material A3: Polyhydroxyalkanoate obtained in Production Example 3 was used.

Production Example 3

A polyhydroxyalkanoate as a raw material A3, PHBH, was obtained in the same manner as in Production Example 1 except that KNK-631 strain was used and palm kernel oil was used as a carbon source. The PHBH had a weight-average molecular weight Mw of 650000 and a 3HH content of 11.4 mol % (3HB content: 88.6 mol %).

Polyhydroxyalkanoate as raw material A4: Poly(3-hydroxybutyrate-co-3-hydroxyvalerate) (3-hydroxyvalerate (3HV) content: 5 mol %, 3HB content: 95 mol %) manufactured by Sigma-Aldrich was used.

Amide bond-containing compound: The following commercially-available product was used.
Raw material B1: BNT22H (behenamide) manufactured by NIPPON FINE CHEMICAL CO., LTD.
Raw material B2: NEUTRON-2 (stearamide) manufactured by NIPPON FINE CHEMICAL CO., LTD.

Examples 1 to 7

(Production of Aliphatic Polyester Resin Composition)

The polyhydroxyalkanoate as a raw material A1, the amide bond-containing compound as a raw material B1 or B2, and pentaerythritol (manufactured by Wako Pure Chemical Industries, Ltd.) were blended in a blending ratio shown in Table 1 (blending ratios shown in the following tables are expressed in part(s) by weight) and melt-kneaded using a co-rotating intermeshing twin screw extruder (TEX30 manufactured by The Japan Steel Works, LTD.) at a preset temperature of 120 to 140° C. and a screw rotation speed of 100 rpm to obtain an aliphatic polyester resin composition. The aliphatic polyester resin composition was extruded through a die into a strand, and the strand was cut to obtain pellets. At this time, a resin temperature at a die outlet varied depending on the amount of the amide bond-containing compound blended or the amount of the pentaerythritol blended, but was in the range of 165 to 190° C.

(Release Time of Injection-molded Article)

The obtained pellets as a raw material were molded into plate-shaped specimens of 150 mm×150 mm×2 mm thick using an injection molding machine (FN1000 manufactured by NISSEI PLASTIC INDUSTRIAL CO., LTD.) under conditions where the cylinder preset temperature of the molding machine was 130 to 160° C. and the preset temperature of a mold was 50° C. A resin temperature at time of injection or a mold temperature was measured by bringing a type K thermocouple into direct contact with an injected molten resin or the surface of the mold, respectively.

The release time was defined as the time required for a molten resin injected into the mold to cure so that a resulting specimen could be released from the mold without distortion when the mold was opened and the specimen was ejected by an ejector pin. A shorter release time means that crystallization is faster and molding processability is better.

Comparative Examples 1 to 4

Pellets of an aliphatic polyester resin composition were prepared in the same manner as in Examples 1 to 7 except that the blending ratio was changed as shown in Table 1. Then, the release time was measured during injection molding. The results are shown in Table 1.

TABLE 1

|  |  |  | Example |  |  |  |  |  |  | Comparative Example |  |  |  |
|---|---|---|---|---|---|---|---|---|---|---|---|---|---|
|  |  |  | 1 | 2 | 3 | 4 | 5 | 6 | 7 | 1 | 2 | 3 | 4 |
| Raw materials | Polyhydroxyalkanoate | Raw material A1 |  |  |  | 100 |  |  |  |  | 100 |  |  |
|  | Amide bond-containing compound | Raw material B1 | 1 | 1 | 1 | 3 | 3 |  |  | 0 | 1 | 3 |  |
|  | Amide bond-containing compound | Raw material B2 |  |  |  |  |  | 3 | 3 |  |  |  | 3 |
|  | Pentaerythritol | — | 1 | 5 | 10 | 1 | 5 | 1 | 5 | 0 | 0 | 0 | 0 |
| Injection molding | Resin temperature at time of injection | ° C. | 181 | 181 | 180 | 179 | 178 | 181 | 181 | 182 | 182 | 180 | 182 |
|  | Mold temperature | ° C. | 51 | 51 | 52 | 52 | 52 | 53 | 53 | 52 | 52 | 52 | 53 |
|  | Release time | sec. | 27 | 20 | 16 | 25 | 17 | 28 | 21 | 57 | 50 | 48 | 56 |

When a molten resin is injected into the mold of 150 mm×150 mm×2 mm thick, a considerable shear force is applied to the resin at time of injection so that shear heat is generated. As a result, an actual resin temperature is much higher than the preset temperature. As shown in Table 1, when the resin temperature was as high as about 180° C. as in the comparative examples, the release time was as long as about 50 seconds or more. On the other hand, as shown in Table 1, when the pentaerythritol was used as in the examples, the release time was shorter in spite of the fact that the resin temperature was as high as that in the comparative examples due to the generation of shear heat. As can be seen from the above, the use of the pentaerythritol makes crystallization faster and improves molding processability.

Examples 8 to 14

(Production of Aliphatic Polyester Resin Composition)

Pellets of an aliphatic polyester resin composition were produced by blending raw materials in a ratio shown in Table 2 using a co-rotating intermeshing twin screw extruder (TEX30 manufactured by The Japan Steel Works, Ltd.) to evaluate pellet productivity.

(Pellet Productivity)

Pellet productivity was evaluated in the following manner. The preset temperature of the extruder was 120 to 140° C., and a screw rotation speed was gradually increased from 100 rpm to increase a discharge rate. A molten resin strand extruded through a die of the extruder is passed through a 1.5 m-long hot water bath filled with water set at 60° C. for crystallization and solidification, and is then cut by a pelletizer to obtain pellets. In order to increase a resin discharge rate to enhance pellet productivity, the linear speed of the strand needs to be increased by increasing the screw rotation speed of the extruder. When the screw rotation speed is increased, a resin temperature is increased by generation of shear heat.

Further, the retention time of the strand in the hot water bath is shortened as the linear speed of the strand is increased. When the resin temperature is increased, the resin is less likely to be crystallized. Further, when the retention time of the strand in the hot water bath at 60° C. is shortened, the resin is not completely crystallized and remains soft. That is, when the resin temperature is increased and the retention time of the strand in the hot water bath is shortened, the strand cannot be cut by the pelletizer. Therefore, the maximum linear speed of the strand at which the strand could be cut into pellets was defined as a measure for evaluating pellet productivity. A higher liner speed means better pellet productivity. It is to be noted that the resin temperature was measured by bringing a type K thermocouple into direct contact with the molten resin extruded through the die of the extruder. The results are shown in Table 2.

Comparative Examples 5 to 9

The pellet productivity of an aliphatic polyester resin composition was evaluated in the same manner as in Examples 8 to 14. The results are shown in Table 2.

(Sheet Productivity in T-Die Molding)

Sheet productivity was evaluated in the following manner. The obtained pellets as a raw material were molded into a 100 mm-wide sheet using a T-die sheet molding machine (Labo Plastomill manufactured by Toyo Seiki Seisaku-sho, Ltd.) under conditions where a die lip thickness was 250 μm, a die lip width was 150 mm, a cylinder preset temperature was 120 to 140° C., a die preset temperature was 150 to 160° C., and a cooling roll preset temperature was 60° C. A molten resin extruded through a T-die as a sheet is crystallized by contact with a cooling roll, and is therefore molded into a 100 μm-thick sheet. When the resin is sufficiently crystallized, the molded sheet is released from the cooling roll and rolled up. However, when the linear speed of the sheet is increased, the time of contact between the sheet and the cooling roll is shortened. As a result, the resin is not crystallized and is therefore not sufficiently solidified, which makes it impossible to release the sheet from the roll. Therefore, the maximum linear speed of the sheet at which the sheet could be released from the cooling roll was defined as a measure for evaluating sheet productivity. A higher liner speed means

TABLE 2

| | | | Example | | | | | | | Comparative Example | | | | |
|---|---|---|---|---|---|---|---|---|---|---|---|---|---|---|
| | | | 8 | 9 | 10 | 11 | 12 | 13 | 14 | 5 | 6 | 7 | 8 | 9 |
| Raw materials | Polyhydroxyalkanoate | Raw material A1 | 100 | 100 | 100 | | | | | 100 | 100 | | | |
| | Polyhydroxyalkanoate | Raw material A2 | | | | 100 | | | | | | 100 | | |
| | Polyhydroxyalkanoate | Raw material A3 | | | | | 100 | | | | | | 100 | |
| | Polyhydroxyalkanoate | Raw material A4 | | | | | | 100 | 100 | | | | | 100 |
| | Amide bond-containing compound | Raw material B1 | 1 | 1 | 3 | 1 | 3 | 1 | 1 | 1 | 3 | 1 | 3 | 1 |
| | Pentaerythritol | — | | 1 | 5 | 1 | 5 | 10 | 1 | 5 | — | — | — | — | — |
| Pellet production | Resin temperature | ° C. | 176 | 190 | 175 | 177 | 165 | 177 | 192 | 170 | 171 | 168 | 168 | 175 |
| | Maximum linear speed of strand | m/min | 22 | 36 | 27 | 23 | 18 | 23 | 37 | 10 | 13 | 8 | 5 | 14 |

As can be seen from Table 2, the use of the pentaerythritol makes it possible to increase the linear speed of a strand and improve pellet productivity.

Examples 15 to 18

(Production of Polyester Resin Composition)

An aliphatic polyester resin composition was obtained by melt-kneading raw materials using a co-rotating intermeshing twin screw extruder (TEX30 manufactured by The Japan Steel Works, Ltd.) at a preset temperature of 120 to 140° C. and a screw rotation speed of 100 rpm. The aliphatic polyester resin composition was extruded through a die into a strand, and the strand was cut to obtain pellets.

better sheet productivity. It is to be noted that the temperature of the molten resin extruded through the T-die was measured by direct contact with a type K thermocouple and defined as a resin temperature.

Comparative Examples 10 to 12

The sheet productivity of an aliphatic polyester resin composition was evaluated in the same manner as in Examples 15 to 18. The results are shown in Table 3.

TABLE 3

| | | | Example | | | | Comparative Example | | |
|---|---|---|---|---|---|---|---|---|---|
| | | | 15 | 16 | 17 | 18 | 10 | 11 | 12 |
| Raw materials | Polyhydroxyalkanoate | Raw material A1 | 100 | 100 | 100 | | 100 | 100 | |
| | Polyhydroxyalkanoate | Raw material A3 | | | | 100 | | | 100 |
| | Amide bond-containing compound | Raw material B1 | 1 | 1 | 3 | 3 | 1 | 3 | 3 |
| | Pentaerythritol | — | 1 | 5 | 1 | 10 | — | — | — |
| T-die molding | Resin temperature | ° C. | 165 | 164 | 164 | 162 | 165 | 164 | 162 |
| | Maximum linear speed of sheet | m/min | 14 | 23 | 16 | 7 | 4 | 5 | 2 |

As can be seen from Table 3, the use of the pentaerythritol makes it possible to increase the linear speed of a sheet and improve sheet productivity.

The invention claimed is:

1. An aliphatic polyester resin composition comprising a polyhydroxyalkanoate (A), an amide bond-containing compound (B), and pentaerythritol (C), wherein
the amide bond-containing compound (B) is any one of compounds represented by the following general formulas:
$R^1$—C(O)N($R^2$)$_2$, $R^1$—C(O)NH—($R^3$)—NHC(O)—$R^1$, $R^1$—NHC(O)NH—($R^3$)—NHC(O)NH—$R^1$, $R^1$—NHC(O)—$R^2$, $R^1$—NHC(O)—($R^3$)—C(O)NH—$R^1$, $R^1$—C(O)NH—($R^3$)—C(O)NH—$R^1$, $R^1$—NHC(O)NH—($R^3$)—C(O)NH—$R^1$, and $R^1$—NHC(O)NH—($R^3$)—NHC(O)—$R^1$, or a combination of two or more of the compounds, and in the formulas,
$R^1$s are each independently a $C_6$ to $C_{30}$ alkyl,
$R^2$s are each independently H or a $C_1$ to $C_{20}$ alkyl, and
$R^3$s are each independently a $C_2$ to $C_{10}$ alkylene.

2. The aliphatic polyester resin composition according to claim 1, wherein the amide bond-containing compound (B) is one or more selected from lauramide, myristamide, stearamide, behenamide, and erucamide.

3. The aliphatic polyester resin composition according to claim 1, wherein an amount of the pentaerythritol (C) is 0.05 to 12 parts by weight with respect to 100 parts by weight of an amount of the polyhydroxyalkanoate (A).

4. The aliphatic polyester resin composition according to claim 1, wherein the polyhydroxyalkanoate (A) contains a repeating unit represented by the following general formula (1)

$$[\text{—CHR—CH}_2\text{—CO—O—}] \quad (1)$$

wherein R is an alkyl group represented by $C_nH_{2n+1}$ and n is an integer of 1 or more and 15 or less.

5. The aliphatic polyester resin composition according to claim 1, wherein the polyhydroxyalkanoate (A) is one or more selected from a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, and a poly(3-hydroxybutyrate-co-4-hydroxybutyrate) copolymer resin.

6. A polyester resin molded article obtained by molding the aliphatic polyester resin composition according to claim 1.

* * * * *